(12) United States Patent
Pierce et al.

(10) Patent No.: US 9,291,179 B2
(45) Date of Patent: Mar. 22, 2016

(54) FASTENER SYSTEM WITH DISSIMILAR METALS

(71) Applicant: Ford Global Technologies, LLC, Dearborn, MI (US)

(72) Inventors: Bruce Frederick Pierce, Farmington Hills, MI (US); John Charles Caris, Hartland, MI (US); Ajay Kumar Gupta, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 14/011,869

(22) Filed: Aug. 28, 2013

(65) Prior Publication Data

US 2014/0345091 A1    Nov. 27, 2014

Related U.S. Application Data

(60) Provisional application No. 61/826,280, filed on May 22, 2013.

(51) Int. Cl.
  *F16B 37/04*    (2006.01)
  *F16B 2/20*     (2006.01)
  *F16B 33/00*    (2006.01)

(52) U.S. Cl.
  CPC .............. *F16B 2/20* (2013.01); *F16B 33/008* (2013.01); *F16B 37/041* (2013.01); *Y10T 24/3427* (2015.01)

(58) Field of Classification Search
  CPC .......... F16B 2/20; F16B 37/04; F16B 37/041; F16B 37/044
  USPC .................. 411/170, 172, 174, 431–432, 901
  See application file for complete search history.

(56) References Cited

U.S. PATENT DOCUMENTS

| | | | | |
|---|---|---|---|---|
| 3,331,273 A | * | 7/1967 | Derby | F16B 37/041 411/436 |
| 3,388,732 A | * | 6/1968 | Holton | F16B 37/041 411/167 |
| 3,426,818 A | * | 2/1969 | Derby | F16B 37/041 411/175 |
| 3,875,661 A | * | 4/1975 | Lidstrom | B60R 19/52 267/140 |
| 3,999,583 A | * | 12/1976 | Nelson | F16B 37/041 411/182 |

(Continued)

FOREIGN PATENT DOCUMENTS

| | | |
|---|---|---|
| CN | 202431725 U | 9/2012 |
| JP | 09-142335 | 6/1997 |
| JP | 2001-011665 | 1/2001 |

OTHER PUBLICATIONS

Courval et al., "Galvanic Corrosion Prevention of Steel-Aluminum Couples", SAE International Technical Papers, Paper No. 932357, Oct. 1, 1993, http://papers.sae.org/932357/.

*Primary Examiner* — Roberta Delisle
(74) *Attorney, Agent, or Firm* — Raymond Coppiellie; Bejin Bieneman PLC

(57) ABSTRACT

An article, for use in coupling a first member including a first material to a second member including a second material different than the first material, includes a clip having a first leg, a second leg, and a middle portion located between the first and second legs. The clip has an inner side including the first material and an outer side including the second material. The clip is aligned on one of the first and second members so the inner side of the clip contacts one of the first and second members and the outer side of the clip contacts the other of the first and second members.

16 Claims, 4 Drawing Sheets

(56) References Cited

U.S. PATENT DOCUMENTS

| | | | | |
|---|---|---|---|---|
| 4,074,491 A * | 2/1978 | Bell | ............ | B64C 1/06 411/116 |
| 4,396,326 A * | 8/1983 | McKinnie, III | ....... | F16B 37/041 411/103 |
| 4,729,706 A * | 3/1988 | Peterson | ............... | F16B 37/041 411/112 |
| 4,778,321 A * | 10/1988 | Okawa | ................... | F16B 4/004 411/523 |
| 5,423,646 A * | 6/1995 | Gagnon | ............... | F16B 37/041 411/174 |
| 5,961,264 A * | 10/1999 | Postadan | ............... | F16B 37/041 411/174 |
| 6,357,980 B1 * | 3/2002 | Lansinger | ............. | F16B 37/041 411/171 |
| 6,688,825 B1 * | 2/2004 | Stewart | .................. | F16B 37/041 411/174 |
| 7,014,409 B2 * | 3/2006 | Allaart | ................ | F16B 15/0092 411/440 |
| 7,654,783 B2 * | 2/2010 | Giraud | .................. | F16B 37/041 411/174 |
| 7,845,388 B2 | 12/2010 | Luo et al. | | |
| 8,231,317 B2 * | 7/2012 | De Gelis | ............... | F16B 5/0225 411/174 |
| 2009/0311071 A1 * | 12/2009 | Allen | .................... | F16B 37/043 411/172 |
| 2011/0256418 A1 | 10/2011 | McGowan et al. | | |
| 2013/0097848 A1 | 4/2013 | Inaba et al. | | |

* cited by examiner

US 9,291,179 B2

FASTENER SYSTEM WITH DISSIMILAR METALS

CROSS REFERENCE TO RELATED APPLICATIONS

This application claims priority to U.S. Provisional Patent Application No. 61/826,280 filed on May 23, 2013, the contents of which are incorporated herein by reference in their entirety.

BACKGROUND

Various types of clips, including U- or J-shaped clips are generally known for use in coupling and/or fastening parts together into a coupling or joint. One known type of vehicle is a pick-up truck having a body on frame construction. In one generally known application, a bed of a pickup truck is supported on a vehicle frame. Attempts to reduce the weight of the pickup truck have included making the bedframe of the pickup truck from lighter materials such as aluminum. However, dissimilar materials forming the joint—an aluminum cross member supported on a steel frame member—has potential to lead to a galvanic reaction and corrosion. Generally, an insulating barrier member has been located between the dissimilar material members so that contact between the parts of the joint only occurs between similar materials thereby reducing the potential for galvanic interaction and corrosion of the joint resulting in a shortened usefulness. It may be possible to coat the various parts of the members of the joint with an insulating barrier to reduce the potential for interaction between members formed from dissimilar materials.

Sometimes, a mechanical fastener or coupler is used to secure the joint between the frame of the bed of the pickup truck, which is made from one material such as aluminum, and the vehicle frame, which is made from another material such as ferrous steel. Since the mechanical fastener or coupler may also be made from only one of these metal materials (and not the other), a portion of it will necessarily come in contact with a member made from a dissimilar material thereby resulting in potential galvanic corrosion. Attempts to avoid contact between dissimilar materials have included coating such fasteners and couplers as well as to make more complex devices. These approaches, however, require a quality initial production installation and may be disturbed due to occasional service during the life of the product, during which the coating or other material intended to prevent contact between dissimilar metal materials may be damaged, removed, or omitted.

DETAILED DESCRIPTION

Figure 1:
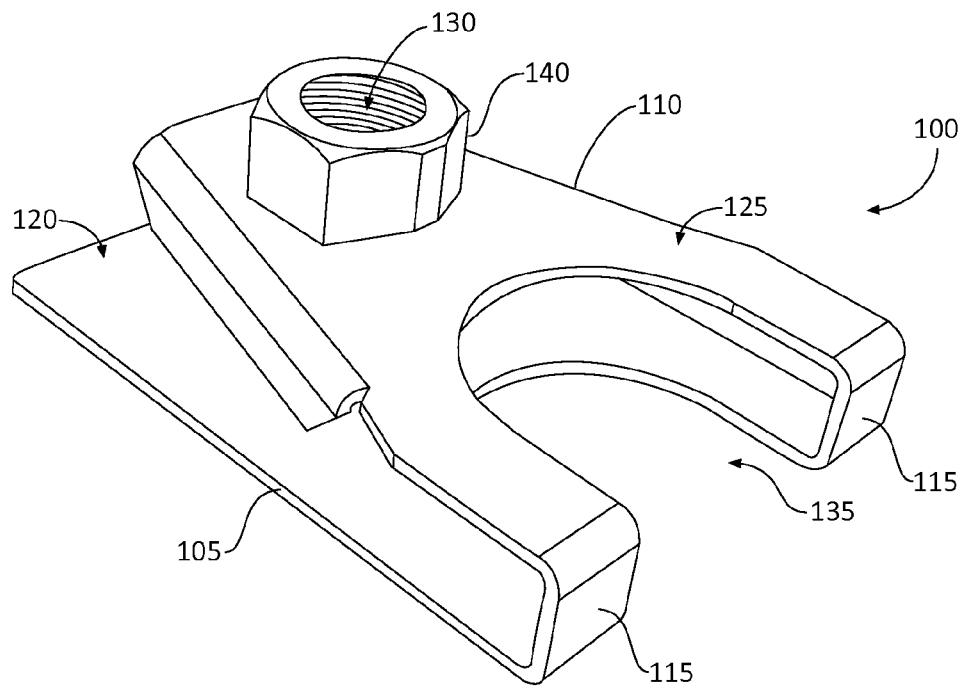
FIG. 1 is a graphic, perspective view of a bi-metal clip according to an exemplary embodiment of the present disclosure.
Figure 2:
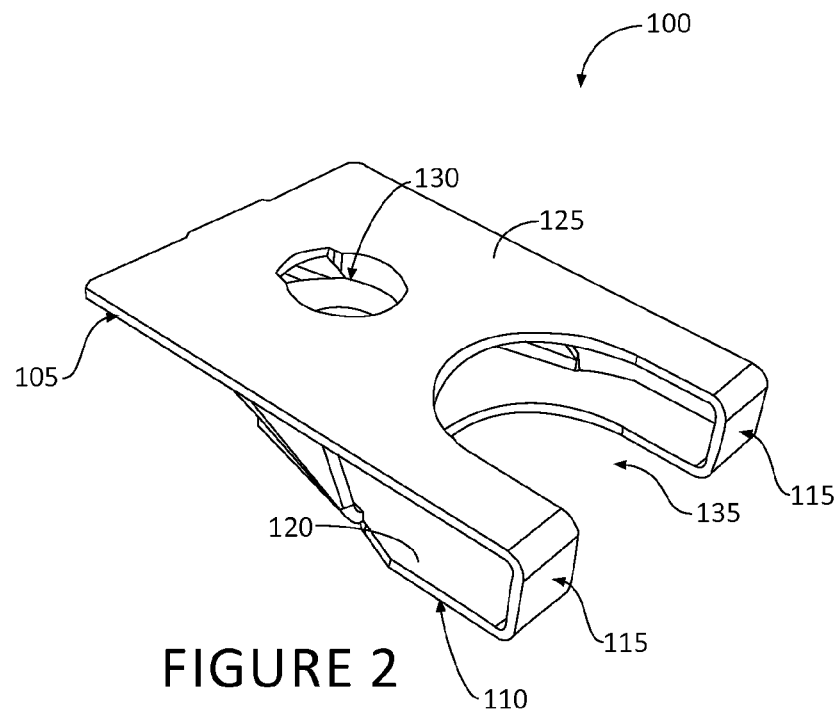
FIG. 2 is an alternate, graphic, perspective view of the bi-metal clip of FIG. 1.

With reference in general to all of the figures and in particular to FIGS. 1 and 2, there is shown a clip according to an exemplary embodiment of the present disclosure. The clip generally may be a U-shaped article and may alternatively be referred to as a J-shaped clip. The clip has particular utility in coupling a component or cross member to a frame as well as in other instances where a part will be joined to another using a fastener, including a threaded fastener. One particular exemplary implementation for the clip may be as part of a fastener or joint for coupling a pickup frame to a vehicle frame. The pickup box commonly includes a frame including a cross member preferably made of a lighter weight material. The pickup box or frame may be commonly mounted on the vehicle frame in what is commonly known as a body on frame vehicle, such as in a pickup truck passenger vehicle or other known vehicles having various applications. The vehicle frame may be made from a generally high strength and durable material appropriate for meeting various industry standards and requirements such as a steel or steel alloy.

The clip may have particular utility in coupling the cross frame member of the pickup box frame, made of aluminum to a bracket coupled to the frame, wherein the bracket (and frame) may be made of a ferrous steel material. Because the vehicle frame (and/or bracket) are made from a first material that may include a ferrous steel and the cross member may be made from a second material that may include an aluminum metal, if the pieces are allowed to be in contact, over time there will be galvanic corrosion of the pieces. However, the clip of the exemplary embodiment of the present disclosure may separate the aluminum cross frame from the ferrous steel bracket and vehicle frame pieces and avoid galvanic corrosion due to the unique construction of the clip.

Referring to FIGS. 1 and 2, a clip 100 includes a first leg 105 and a second leg 110 separated by a middle or bight portion 115. The first leg 105 generally extends in a plane aligned parallel to the second leg 110 which also extends generally in a parallel plane. In one exemplary approach, the clip 100 may be made from a layered composite blank including two materials. Once the blank is formed from the two materials, it may be further formed into the clip. When the blank is formed into the clip, one layer of the blank may be an inner portion 120 or layer of the clip 100 and the second layer of the blank may be an outer portion 125 or layer of the clip. In one exemplary approach, one layer of the blank may be a ferrous metal a second layer of the blank may be an aluminum material. It may be possible to reverse the layers of the blank for a particular application. It may also or alternatively be possible to select any material to be the first layer of the blank and any other material to be the second layer of the blank.

The layered composite blank or strip coil used for making the clip 100 may be formed, manufactured, or produced in a cold roll bonding (CRB) process. CRB is a solid phase method of bonding different metals using a rolling process that may be conducted at room temperature. The CRB process may be designed to receive a first piece of material or a blank made from a first material and a second piece of material or a blank made from a second material different than the first material. Alternatively, any other known or appropriate process may be used to form the layered blank including, but not limited to, a hot roll bonding process may be used to bond the different metals in a rolling process at an elevated temperature. Once the layered blank is produced, it may be formed into a generally U-shaped intermediate article.

The layered blank, or intermediate article, may be further formed to include additional features. As best shown in FIG. 1, the first leg 105 further includes folded and angled sides. Additionally, before during and/or after the forming of the blank, additional features and details may be added to the blank. For example, prior to and/or as part of forming the layered blank into the intermediate article, holes 130 may be punched or formed in the first and second legs 105, 110, and a passage 135 may be punched or formed in the first leg 105, the middle portion 115, and the second leg 110 as best shown in FIGS. 1 and 2.

Figure 3:
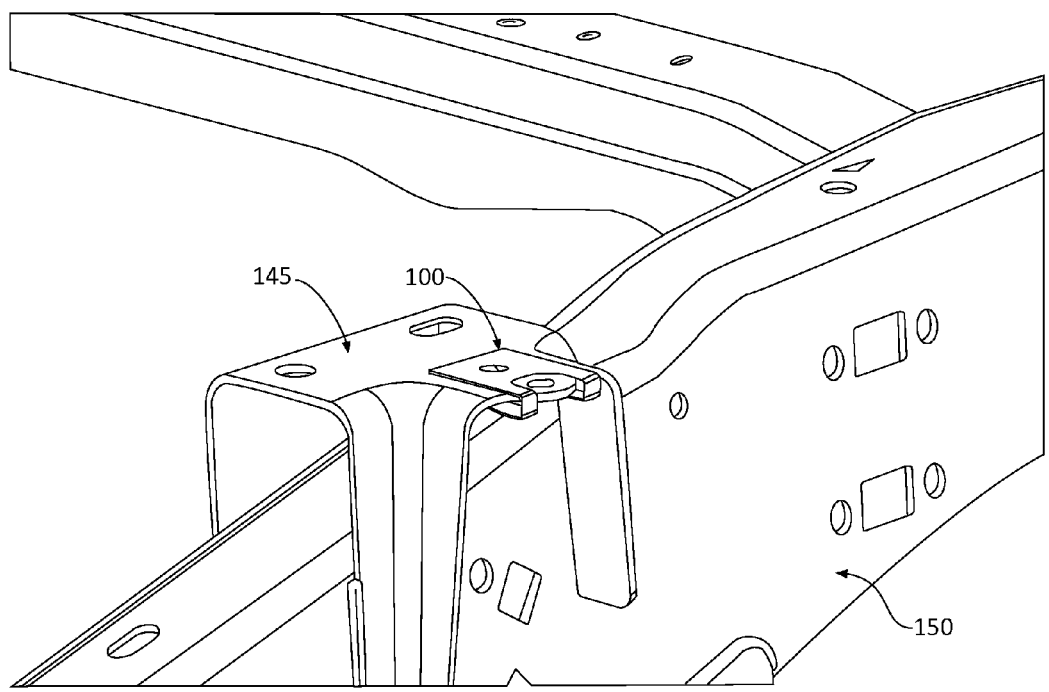
FIG. 3 is a partial, perspective view of a vehicle frame including a bi-metal clip installed thereon according to an exemplary embodiment of the present disclosure.
Figure 4:
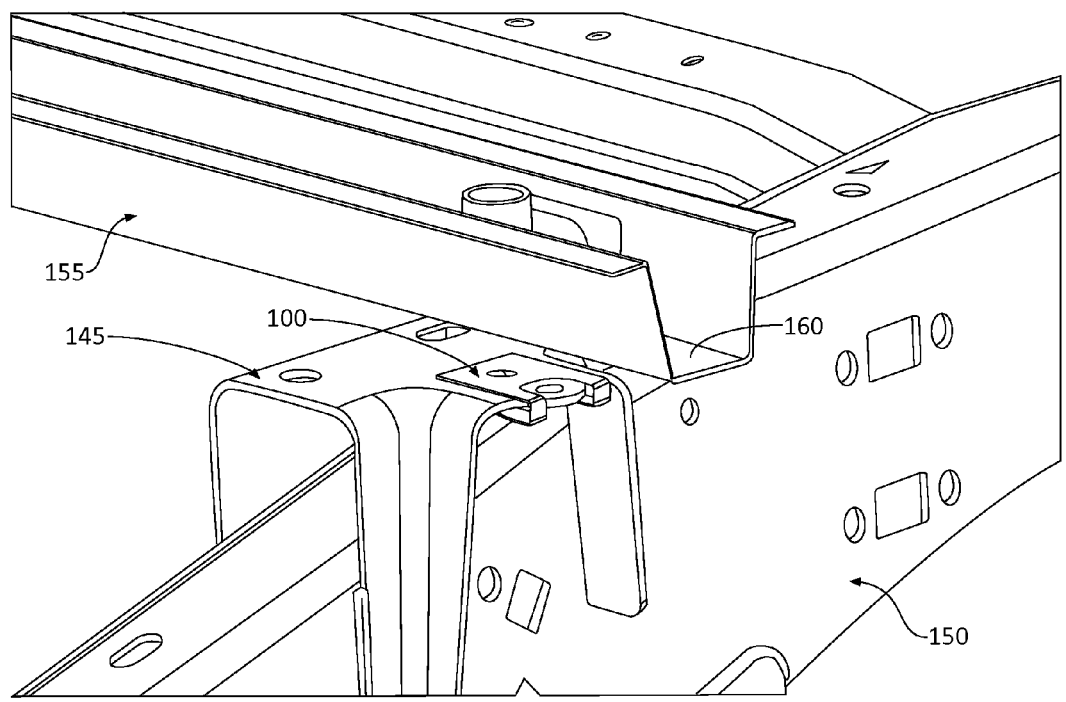
FIG. 4 is a partial, perspective view of the vehicle frame and bracket including the bi-metal clip installed thereon of FIG. 3 and showing the addition of the aluminum cross member of the bed of the pickup truck according to an exemplary embodiment of the present disclosure.
Figure 5:
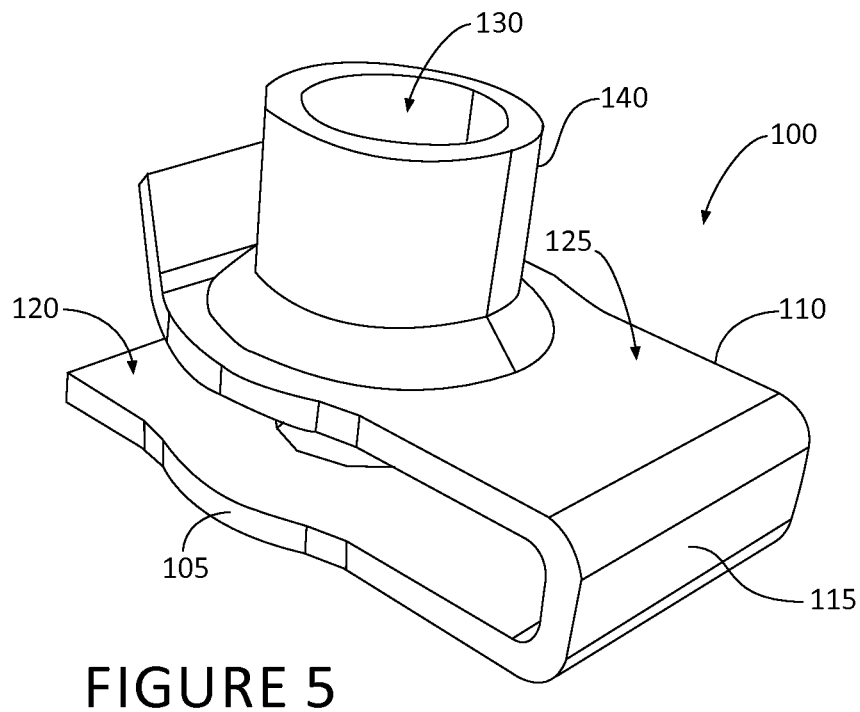
FIG. 5 is a partial, perspective view of an additional exemplary embodiment of the vehicle frame and bracket including the bi-metal clip installed thereon disclosing an alternate embodiment thereof wherein the nut of the bi-metal clip is formed from an extruded hole in the second leg of the clip according to an alternate exemplary embodiment of the present disclosure.
Figure 6:
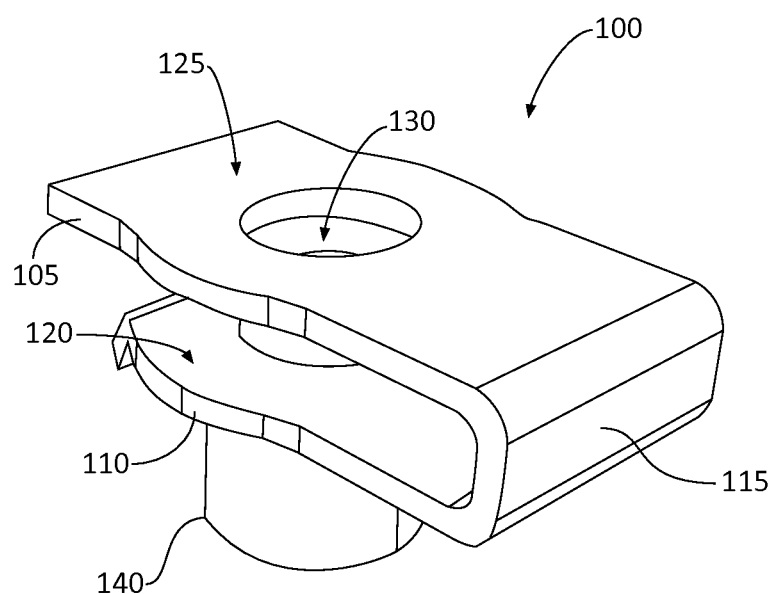
FIG. 6 is an alternate, graphic, perspective view of the bi-metal clip of FIG. 5.

In one exemplary implementation, the first leg 105 of the bi-metal clip 100 may include a nut 140 or boss member coupled to or formed with the first leg 105 using any appropriate coupling, forming, or connecting construction and/or material. The nut 140 may be coupled to the first leg 105 using a staking process. The nut 140 or boss member may include a central unthreaded hole that may be aligned with the hole 130 in the first leg 105. The hole 130 in the first leg 105 may be aligned with the hole 130 in the second leg 110. With the holes 130 of the legs aligned, a threaded bolt or other fastener may pass through the hole 130 in the first leg 105 and the hole 130 in the second leg 110 and then may be engaged with the unthreaded hole 130 of the nut 140. While any fastener may be used, an unthreaded nut 140 may be used and the threads of the bolt "cut" the threads in the hole 130 in the nut 140 for ease and robustness of assembly process. Alternative fasteners may be used including threaded nuts as well as an "extruded" nut that may be formed from the material of the bi-metal clip 100 itself. Once the clip 100 is completely formed and the nut 140 is coupled to the first leg 105, the clip 100 may be coated using any material for inhibiting and/or preventing oxidation of the metals of the clip. The inner layer 120 of the bi-metal clip 100 formed from the first material may be separated from the outer layer 125 of the bi-metal clip 100 formed from the second material. Once the bi-metal clip 100 is completely finished, it may be installed and/or used in a joint or other coupling as shown in FIGS. 3-5. Accordingly, the bi-metal clip 100 may be particularly useful for coupling members having dissimilar materials. As noted above, in another alternative, the bi-metal clip 100 may replace the staked nut 140 with having a portion of the second leg 110 drawn or extruded from the material of the bi-metal plate during the forming process, to provide a structure into which a threaded fastener may be driven and coupled. The present exemplary extruded nut 140, best shown in FIGS. 5 and 6, is an alternative to the separate nut 140 of the other figures.

Referring to FIG. 3, the bi-metal clip 100 is shown installed on an upper surface of a bracket or support member 145 coupled to the vehicle frame 150. The upper surface of the bracket is located on the vehicle frame 150 for receiving and supporting a bed frame of a pickup. In one exemplary implementation, the bracket or support member 145 is made from a ferrous steel and the bed frame cross member 155 is made from an aluminum metal or metal alloy. In one possible approach, the bracket or support member 145 is made from a high strength low alloy ferrous steel and the pickup box bed frame cross member 155 is made from a 5000 series aluminum but may be made from any known or appropriate aluminum or aluminum alloy as well as other similar materials. The upper surface of the bracket 145 is defined by a generally planar portion of the support member 145 including an edge located on one side of the support member 145. Proximal the edge of the support member 145 is a first hole and distal from the edge and the first hole is a second hole. The bi-metal clip 100 is located or installed on edge of the planar portion of the support member 145 such that the first and second holes 130 of the bi-metal clip 100 may be aligned with the second hole in the support member 145 and the passage 135 of the bi-metal clip 100 is aligned with the first hole of the planer portion of the support member 145.

The cross member 155 of the pickup box bed frame has a generally U-shaped or inverted top hat cross-section construction defining a middle surface 160. The bed frame cross member 155 may include a hole in the middle surface 160 or any portion of the cross member 155 to be aligned with the first and second holes 130 of the bi-metal clip 100 and the second hole of the support member 145 coupled to the vehicle frame 150. While only the bed frame cross member 155 is shown in the figures, the cross member 155 may be coupled to an entire pickup box of the pickup truck vehicle. The support member 145 coupled to the bracket support member 145 and/or vehicle frame 150 is designed and intended to support the entire bed. The other portions of the bed frame may be similarly coupled to other bracket support members (not shown) and/or the vehicle frame 150. With particular reference to FIG. 4, the inner layer 120 of the bi-metal clip 100 is a material that is the same as the bracket support member 145 and the outer layer 125 of the bi-metal clip 100 is the same material as the bed frame cross member 155. The second leg 110 of the bi-metal clip 100 is located between the upper surface of the bracket support member 145 and the lower surface of the cross member 155 to provide separation between the cross member 155 and the support member 145. Accordingly, the dissimilar materials are physically separated by the clip 100 and the potential for galvanic corrosion is avoided.

Referring in particular to FIG. 4, the aluminum cross member 155 is supported by the second leg 110 of the bi-metal clip 100 on the upper surface of the bracket support member 145. A threaded bolt or other fastener or coupler (not shown) may be used to install or secure the bed frame and the cross member 155 to the bracket support member 145. Since the end of the threaded bolt (not shown) may be received in the threaded hole in the nut 140 (see FIG. 1) coupled to the outer surface of the first leg 105 of the clip, the threaded bolt may be made from the same or similar material as the nut 140. In particular, the parts may be made from compatible materials that do not cause galvanic corrosion. The bi-metal clip 100 may provide a unique and highly efficient article and method of avoiding and/or eliminating galvanic corrosion in coupling parts having dissimilar metal materials. The bi-metal clip 100 may be particularly useful in combination with other techniques for limiting and/or preventing galvanic corrosion including, in particular, coating the metals to prevent oxidation.

In one possible approach, the bi-metal clip 100 may provide and ensure accurate location and installation of the bi-metal clip 100 between the box cross frame member and the bracket support member 145 due to the unique construction of the bi-metal clip. If the bi-metal clip 100 is not installed (or installed improperly), the cross member 155 of the box bed frame may not be secured to the vehicle frame 150. Similar to the installation of the bi-metal clip, the equipment used to manufacture the bi-metal clip 100 may be modified to provide distinctive detection, via magnetic and/or visual detection, of the two materials of the bi-metal clip 100 during the forming operation(s), to ensure the materials are presented to the forming equipment in the proper orientation. Since the ferrous steel and the aluminum have different magnetic and color properties, it may be possible to include magnetic detection and/or vision circuitry that may identify proper orientation of the materials in the processing of the bi-metal clip 100 may be similarly done when installing the bi-metal clip. Thus, if the bi-metal clip 100 has been properly manufactured, installation of the bi-metal clip 100 in the vehicle may be inherently error-proof with such position locating techniques.

The present disclosure is intended to be illustrative and not restrictive. Many embodiments as well as many applications besides the examples provided will be apparent to those of skill in the art upon understanding the present disclosure. The scope of the claimed invention should, therefore, not be determined with limiting reference to the detailed description and figures, but should instead be determined with reference to the appended claims, along with the full scope of equivalents to which such claims are entitled. Any disclosure of an article or reference, including patent applications and publications, is incorporated by reference herein for all purposes. Any omission in the following claims of any aspect of subject matter disclosed herein is not a disclaimer of such subject matter.

Any numerical values recited herein or in the figures are intended to include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless expressly stated, all ranges are intended to include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The use of the term "consisting essentially of" to describe a combination shall include the elements, ingredients, components or steps identified, and such other elements ingredients, components or steps that do not materially affect the basic and novel characteristics of the combination. The use of the terms "comprising" or "including" describing combinations of elements, ingredients, components or steps herein also contemplates embodiments that consist essentially of the elements, ingredients, components or steps. By use of the term "may" herein, it is intended that any described attributes that "may" be included may be optional unless expressly stated or otherwise necessary.

The disclosure of "a" or "one" to describe an element, ingredient, component or step is not intended to foreclose additional elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps.

The invention claimed is:

1. An article for use in coupling a first member including a first material to a second member including a second material different than the first material, the article comprising:
   a clip having a first leg, a second leg, and a middle portion located between the first and second legs, the clip having an inner side including the first material and an outer side including the second material and wherein the first material and the second materials are different metals roll-bonded to one another to reduce galvanic corrosion between the first material and the second material of the clip; and
   wherein the clip is aligned on one of the first and second frame members so the inner side of the clip contacts one of the first and second members and the outer side of the clip contacts the other of the first and second members.

2. The article of claim 1, wherein the first material includes ferrous steel and the second material includes aluminum.

3. The article of claim 2, wherein the second material is 5052 aluminum.

4. The article of claim 1, wherein the first material includes a ferrous steel alloy.

5. The article of claim 1, wherein the first material has a thickness approximately equal to a thickness of the second material.

6. The article of claim 1, wherein the clip includes a hole in the second leg aligned with a threaded hole in the nut on the second leg for receiving a fastener for coupling the first member, the second member, and the clip while keeping the first material of the clip and of the first member separate from the second material of the second member and thereby avoiding galvanic corrosion.

7. The article of claim 1, further comprising a nut coupled to the outer side of the first leg.

8. The article of claim 7, wherein the nut is integrally formed with the clip.

9. The article of claim 7, wherein the nut includes a threaded hole.

10. The article of claim 7, wherein the nut includes an unthreaded hole.

11. An assembly comprising:
    a first member at least partially formed from a first material;
    a second member at least partially formed from a second material, wherein the second material is different from the first material;
    a clip having a first leg, a second leg, and a middle portion located between the first and second legs, the clip having an inner side including the first material and an outer side including the second material and wherein the first material and the second materials are different metals roll-bonded to one another to reduce galvanic corrosion between the first material and the second material of the clip; and
    wherein the clip is aligned on one of the first and second members so the inner side of the clip contacts one of the first and second members and the outer side of the clip contacts the other of the first and second members.

12. The assembly of claim 11, wherein the first material of the clip has a thickness approximately equal to a thickness of the second material of the clip, or any proportion as necessary for intended function.

13. The assembly of claim 11, wherein the clip includes a hole in the second leg aligned with a threaded hole in the nut on the second leg for receiving a fastener for coupling the first member, the second member, and the clip while keeping the first material of the clip and of the first member separate from the second material of the second member and thereby avoiding galvanic corrosion.

14. The assembly of claim 11, wherein the clip includes a nut coupled to the outer side of the first leg.

15. The assembly of claim 14, wherein the nut is integrally formed with the clip and includes at least one of a threaded hole and an unthreaded hole.

16. A clip for use in coupling a first member including a first material to a second member including a second material different than the first material, the clip comprising:
   a first leg;
   a second leg defining a hole;
   a middle portion located between the first and second legs; the first leg, the second leg, and the middle portion each having an inner side including the first material and an outer side including the second material, wherein the first material and the second material are different metals and wherein the first material is roll-bonded to the inner side of the first leg, the second leg, and the middle portion and wherein the second material is roll-bonded to the outer side of the first leg, the second leg, and the middle portion, the first material having a thickness approximately equal to a thickness of the second material; and
   a nut disposed on or integrally formed with the outer side of the first leg, the nut configured to receive a fastener for coupling to the first member and to the second member while separating the first material of the first member from the second material of the second member
   wherein roll-bonding the first material to the second material reduces galvanic corrosion between the first material and the second material of the clip.

* * * * *